(12) United States Patent
Duininck et al.

(10) Patent No.: US 7,434,850 B2
(45) Date of Patent: Oct. 14, 2008

(54) FLUID-TIGHT COUPLING SYSTEM FOR CORRUGATED PIPE

(75) Inventors: Jeremy N. Duininck, New London, MN (US); Michael L. Pluimer, Raymond, MN (US)

(73) Assignee: Prinsco, Inc., Willmar, MN (US)

( * ) Notice: Subject to any disclaimer, the term of this patent is extended or adjusted under 35 U.S.C. 154(b) by 558 days.

(21) Appl. No.: 11/241,192

(22) Filed: Sep. 30, 2005

(65) Prior Publication Data

US 2007/0075544 A1    Apr. 5, 2007

(51) Int. Cl.
    *F16L 17/00*    (2006.01)
(52) U.S. Cl. ...................... 285/374; 285/903
(58) Field of Classification Search .............. 285/374, 285/379, 903
    See application file for complete search history.

(56) References Cited

U.S. PATENT DOCUMENTS

| | | | |
|---|---|---|---|
| 3,467,413 A | 9/1969 | Madrelle | |
| 3,669,474 A | 6/1972 | Bode | |
| 3,693,664 A | 9/1972 | Schmunk | |
| 3,699,684 A | 10/1972 | Sixt | |
| 3,747,960 A | 7/1973 | Bawa | |
| 3,781,041 A | 12/1973 | Petzetakis | |
| 3,785,682 A | 1/1974 | Schaller et al. | |
| 3,953,057 A | 4/1976 | Petzetakis | |
| 3,958,719 A | 5/1976 | Ward | |
| 4,037,626 A | 7/1977 | Roberts, Jr. | |
| 4,082,327 A * | 4/1978 | Sting et al. | 285/903 |
| 4,141,576 A | 2/1979 | Lupke et al. | |
| 4,149,740 A | 4/1979 | Hall | |
| 4,202,568 A | 5/1980 | Strom | |
| 4,247,136 A | 1/1981 | Fouss et al. | |
| 4,304,415 A | 12/1981 | Wolf et al. | |
| 4,368,894 A | 1/1983 | Parmann | |
| 4,426,105 A | 1/1984 | Plaquin et al. | |
| 4,437,691 A | 3/1984 | Laney | |
| 4,443,031 A | 4/1984 | Borsh et al. | |
| 4,474,392 A | 10/1984 | Vassallo et al. | |
| 4,487,421 A | 12/1984 | Housas et al. | |
| 4,542,922 A | 9/1985 | Grossauer | |
| 4,591,193 A | 5/1986 | Oltmanns et al. | |
| 4,702,502 A | 10/1987 | Shade et al. | |
| 4,779,651 A | 10/1988 | Hegler et al. | |
| 4,913,473 A | 4/1990 | Bonnema et al. | |

(Continued)

*Primary Examiner*—David E Bochna
(74) *Attorney, Agent, or Firm*—Schroeder & Siegfried, P.A.

(57) ABSTRACT

A bell and spigot coupling system is provided for joining corrugated plastic pipe which improves the coupling's sealing capability with increasing hydrostatic pressure, and causes a substantial component of the force generated therefrom to be absorbed axially through the coupled sections of adjoining pipe. The spigot end of one pipe which is received within a bell coupler for an adjoining pipe terminates in a small annular bed-forming rib which forms a gasket bed that holds a gasket compressed against a radially extending gasket sealing surface of the bell coupler. Inward protruding latches formed in the bell coupler engage the adjoining section of corrugated pipe to resist axial separation and hold the gasket compressed against the sealing surface of the bell coupler. The sealing surface of the bell coupler contours the spigot end of the adjoining pipe and forms radially constricting pathways at opposite sides of the gasket. The presence of either internal or external hydrostatic pressure on the coupling joint causes the gasket to wedge into one of the opposing radially constricted pathways, thus transferring the force generated by such pressure axially through the coupled sections of pipe.

34 Claims, 7 Drawing Sheets

U.S. PATENT DOCUMENTS

| | | |
|---|---|---|
| 4,969,670 A | 11/1990 | Bonnema et al. |
| 5,071,173 A | 12/1991 | Hegler et al. |
| 5,078,430 A | 1/1992 | St. Onge |
| 5,080,405 A | 1/1992 | Sasa et al. |
| 5,096,206 A | 3/1992 | Andre et al. |
| 5,163,717 A | 11/1992 | Wise |
| 5,180,196 A | 1/1993 | Skinner |
| 5,326,138 A | 7/1994 | Claes et al. |
| 5,335,945 A | 8/1994 | Meyers |
| 5,415,436 A | 5/1995 | Claes et al. |
| 5,463,187 A | 10/1995 | Battle |
| 5,765,880 A | 6/1998 | Goddard |
| 5,992,469 A | 11/1999 | Hegler |
| 5,996,635 A | 12/1999 | Hegler |
| 6,126,209 A | 10/2000 | Goddard |
| 6,199,592 B1 * | 3/2001 | Siferd et al. ............... 285/903 |
| 6,367,802 B1 * | 4/2002 | Knapp ...................... 285/903 |
| 6,578,608 B2 * | 6/2003 | Hegler ...................... 285/903 |
| 6,578,882 B2 | 6/2003 | Toliver |
| 6,752,435 B1 | 6/2004 | Sorkin |
| 6,938,933 B2 | 9/2005 | Starita |
| 6,994,381 B1 * | 2/2006 | Shade et al. ............... 285/903 |
| 7,306,264 B2 * | 12/2007 | Goddard et al. ........... 285/374 |

* cited by examiner

FLUID-TIGHT COUPLING SYSTEM FOR CORRUGATED PIPE

BACKGROUND OF THE INVENTION

The present invention relates generally to the art of coupling systems for connecting tubing, pipe and the like. More specifically, the present invention has application to coupling systems for connecting corrugated plastic pipe used in watertight gravity-flow drainage and sewage applications, and particularly such type of pipe having a smooth interior wall for handling increased fluid flow capacity, as well as increased internal and external hydrostatic pressures. Although the present invention has particular relevance to the above applications, it will be appreciated that the principles of the present invention may also find application in other types of pipe and tubing configurations where watertight joints are deemed desirable.

Under current standards established by the American Society of Testing and Materials (ASTM), it is required that corrugated polyethylene pipe intended for use in certain drain and gravity sewage applications achieve a watertight joint to a pressure of 10.8 psi during laboratory testing. In attempting to meet these standards, manufacturers of corrugated polyethylene pipe have traditionally utilized a bell and spigot joint design, whereby a gasket is compressed radially between the outside diameter (OD) of the spigot and the internal diameter (ID) of the bell. These types of designs have been widely utilized and are disclosed in a number of different patents (e.g. U.S. Pat. Nos. 6,126,209; 5,415,436; and 5,071,173). Some manufacturers have also attempted to utilize a means of reinforcement around the OD of the bell, as well as some stiffening foams within the internal corrugations of the sealing portion on the spigot (e.g. U.S. Pat. No. 6,578,882).

Although the traditional bell and spigot design with a radially compressed gasket does work well to provide an adequate seal in a number of applications, the design has several shortcomings. First, if there is insufficient restraint to hold the radially compressed gasket in place, the lateral or axial force exerted on such gasket due to hydrostatic pressure can cause the gasket to slip or "blow out," thereby causing leakage between the spigot and bell. With a radially compressed gasket, such restraint is at least partly frictional by nature, due to the inherent properties of the gasket material. However, in order to facilitate joint assembly, it is often necessary to apply a lubricant to the gasket, which lowers its coefficient of friction, thus exasperating the problem of slippage.

To compensate for this, and in order to achieve a watertight joint to a pressure of 10.8 psi, it is desirable and beneficial to minimize the lateral or axial force exerted on such a gasket. Since the axial force exerted on the gasket is directly proportional to the difference of the diameters of the bell and spigot squared ($D_{bell}^2 - D_{spigot}^2$), to reduce this force, the clearances between the bell and spigot need to be kept at a minimum. By way of example, for a lateral gasket force of 200 lb, and a coefficient of friction between the gasket and pipe wall of 0.4, it is estimated that the compressive force on the gasket has to be on the order of 500 lb to restrain the gasket from slipping.

Thus, in order to minimize the potential for gasket slippage, it becomes necessary to have a very small clearance between the bell and the spigot. This minimizes the force on the gasket when the joint is pressurized, but, from a manufacturing standpoint, can be difficult to hold the tight tolerances required. Also, while closer tolerances mean better sealing, it does lead to more difficult installation, due to the friction between the gasket and the bell.

Another issue with the current bell and spigot design utilizing a radially compressed gasket is that the internal water pressure in the joint system causes the bell to expand at the point of intersection with the gasket, thereby causing further leakage. The bell has to be sufficiently stiff to restrain this force, and with larger pipe sizes (e.g. 42" and larger), it becomes quite difficult to manufacture a bell with enough stiffness to meet this criteria. Therefore, as stated previously, some manufacturers have resorted to adding reinforcing bands around the exterior of the bell to keep the bell from expanding (and thereby creating a leak in the system). These bands can be effective, but are also costly and add to the manufacturing process.

It is evident then that the current coupling systems used for corrugated plastic pipe in watertight gravity-flow drainage and sewage applications have inherent limitations which make them more prone to leakage problems when subjected to increasing internal and external hydrostatic pressures, particularly when those pressures exceed 10 psi. The present invention, as described hereafter, marks a departure from conventional coupling systems and contemplates a new and improved coupling system that will eliminate or significantly reduce the above-mentioned problems, and others, of the current joint designs.

BRIEF SUMMARY OF THE INVENTION

In accordance with the present invention, a bell and spigot coupling system is provided for joining corrugated plastic pipe which effectively improves the coupling's sealing capability with increasing hydrostatic pressure, and absorbs a substantial component of the force generated therefrom axially through the coupled sections of adjoining pipe. The coupling system is particularly well suited for use in gravity-flow drainage and sewage applications requiring watertight joints and involving the use corrugated plastic pipe of the type having a smooth inner cylindrical liner connected to an outer corrugated sidewall defined by alternating annular rib and valley portions. It is contemplated that the bell coupling portion of the system may be separate from or, as shown and described in the preferred embodiment herein, made as an integral part of the end of a section of corrugated pipe.

As part of the new coupling system, the spigot end of one section of corrugated pipe which is received within a bell coupler of an adjoining section of pipe terminates in a small annular gasket bed-forming rib, the outer diameter of which is substantially reduced relative to the outer diameter of the remaining annular ribs which define the outer corrugated sidewall of the pipe. This terminal bed-forming rib connects to and is integrally formed with the leading rib wall of the first annular rib at a point immediately adjacent the inner liner of the pipe. The intersection between the terminal bed-forming rib and leading annular pipe rib forms an annular gasket bed which opens outwardly and retains an elastomeric gasket therein.

The bell coupler which receives the spigot end of the above section of pipe is formed as a sleeve element having a generally cylindrical sidewall with an inner diameter just slightly greater than the outside diameter of the section of pipe received therein. Formed as a part of the bell and disposed immediately adjacent the inserted spigot end of the pipe is a generally radially extending gasket sealing surface. The gasket sealing surface extends generally radially inward from the sidewall of the bell toward the terminal bed-forming rib of the inserted section of pipe, and follows generally the contour of the spigot end thereof. This not only serves to reduce the necessary volume of gasket required to provide an effective seal, but as will be more fully explained hereafter, provides additional advantages as well.

Importantly, the gasket sealing surface of the bell forms an interface with the spigot end of the inserted section of pipe which defines a first constricted pathway at one side of the gasket, and a second constricted pathway at an opposing side of the gasket, radially inward from the first constriction. The first constricted pathway converges generally radially outward along the interface of the gasket sealing surface and the leading rib wall of the first annular rib of the spigot end of the inserted pipe. The second constricted pathway, at an opposing side of the gasket, converges generally radially inward along the interface of the gasket sealing surface and the terminal wall of the gasket bed-forming rib. Consequently, at the interface between the gasket sealing surface and spigot end of the pipe, the general pathway defined therebetween constricts away from the gasket bed, and thus the gasket, in generally opposite radial directions.

To form the above interface, the gasket sealing surface of the bell coupler is designed with an undulated cross sectional configuration. A first curvature in the gasket sealing surface arcs inwardly toward the gasket bed and leading annular rib wall to form the first constricted pathway. A second curvature in the gasket sealing surface arcs outwardly and contours the terminal bed-forming rib to form the second constricted pathway. The combination of the two defines the desired interface between the gasket sealing surface and spigot end of the pipe, and the curved profile thereof provides the further advantage of strengthening the bell portion of the interface against outward deflection caused by excessive build-up of hydrostatic pressure within the coupling system.

The gasket, which is seated and retained within the gasket bed, is constructed of sufficient volume to fill the gasket chamber formed by the gasket bed, and protrude outwardly beyond the outer confines of the bed-forming rib. Under such conditions, upon perfecting the coupled joint, the gasket will bear against the generally radially extending gasket sealing surface of the bell coupler and be compressed thereby, resulting in compression of the gasket in an axial direction. Preferably, the gasket is constructed of sufficient volume such that, when compressed, it will tend to flow into the constricted pathways defined on opposite sides thereof.

To complete the coupling system, and assure proper joint alignment and compression of the sealing gasket, a plurality of circumferentially spaced latch members or locking tabs are formed in the sidewall of the bell coupler. Such locking tabs protrude radially inward from the sidewall of the bell and, when properly aligned, extend into an annular recess or channel formed in the inserted section of pipe so as to catch and lock the pipe in place within the bell. The locking tabs benefit the installer of such pipe by providing knowledge of when the joint is properly installed. When all the tabs are locked in position, the installer knows the joint is properly aligned and the gasket has received the correct amount of compression. Such tabs also help resist axial separation of adjoining pipe sections and, in conjunction with backfill material surrounding the pipe, hold the gasket compressed against the sealing surface of the bell coupler.

With the bell and spigot properly joined, the gasket sealing surface of the bell coupler will compress the gasket within the gasket bed and interface with the spigot end of the adjoining pipe to form the radially constricting pathways at opposite sides of the gasket. As the coupled joint is internally pressurized, the gasket will be forced into the first radially constricted pathway, thus creating a wedging effect which improves the seal's effectiveness and causes a substantial component of the force generated therefrom to be absorbed axially through the coupled pipe. Likewise, as the coupled joint is externally pressurized, the gasket will be forced into the second radially constricted pathway, also causing a wedging effect that improves the seals effectiveness and causes a substantial component of the force generated therefrom to be absorbed axially through the coupled pipe. Consequently, radial forces at the coupled joint are minimized and, either way, the joint's effectiveness is improved under increased hydrostatic pressure, up to the point of excessive deflection of the radially extending sealing surfaces of the bell and spigot, which is well outside of the intended operating range of system pressures.

As an alternative embodiment, it is contemplated that a filler material, such as foam, may be injected into the cavity formed between the leading annular rib and inner liner of the pipe. This will act to reinforce or strengthen the leading rib wall against which the gasket bears under compression, thus further enhancing the joint's sealing effectiveness upon experiencing increased hydrostatic pressure.

The present invention marks a significant improvement over conventional bell and spigot coupling systems in that the joint configuration and placement of the gasket is such that the gasket is compressed between generally radial, rather than axial, extending surfaces, resulting in an axially compressed sealing gasket, as opposed to a radially compressed gasket. Consequently, with the present invention, increasing internal and external pressure on the coupling system tends to improve the effectiveness of the seal. Also, unlike the prior art, there is minimal reliance on friction between the gasket and the sealing surface, and the present coupling design assures that under fluid pressure from either direction, the gasket will tend to wedged into a smaller volume, thus assuring tighter sealing as the pressure increases. There will be no opportunity for the gasket to "roll over" and leak, as is common in conventional bell and spigot coupler designs utilized in watertight applications.

As a further advantage of the present invention, the positioning of the gasket at the end of the pipe allows for easier installation, inasmuch as there will be no friction between the gasket and any other surface while inserting the spigot end into the bell. As stated previously, with gaskets using axial surfaces for sealing, the dimensional control between the bell and the gasket is very critical. Closer tolerances mean better sealing, but also lead to more difficult installation. Normal practice is to use a lubricant on the gasket during installation to lower the gasket's coefficient of friction, thereby reducing the force needed to insert the spigot into the bell. The design of conventional couplers with axial sealing surfaces inherently involves compromise between better sealing and easier installation. Consequently, it is not unusual when designing such conventional couplers to have to reconstruct the joint-forming molds a number of times before finding an acceptable balance between sealing and ease of installation. This problem is effectively eliminated in the present coupling design.

As still another advantage of the present invention, since placement of the gasket is at the end of the pipe, no external banding is required to keep the bell from expanding under pressure, as internal and external fluid pressures are substantially transferred and absorbed axially through the coupling system. Notwithstanding the above, as an optional feature of the present coupling system, a supplemental or alternative annular channel may be formed in the outer corrugated sidewall of the spigot pipe for sealing in a conventional manner against the inner axial surface formed by the bell, if so desired.

BRIEF DESCRIPTION OF THE DRAWINGS

These and other objects and advantages of the invention will more fully appear from the following description, made in connection with the accompanying drawings wherein like reference characters refer to the same or similar parts throughout the several views, and in which.

DETAILED DESCRIPTION OF THE INVENTION

Figure 1:
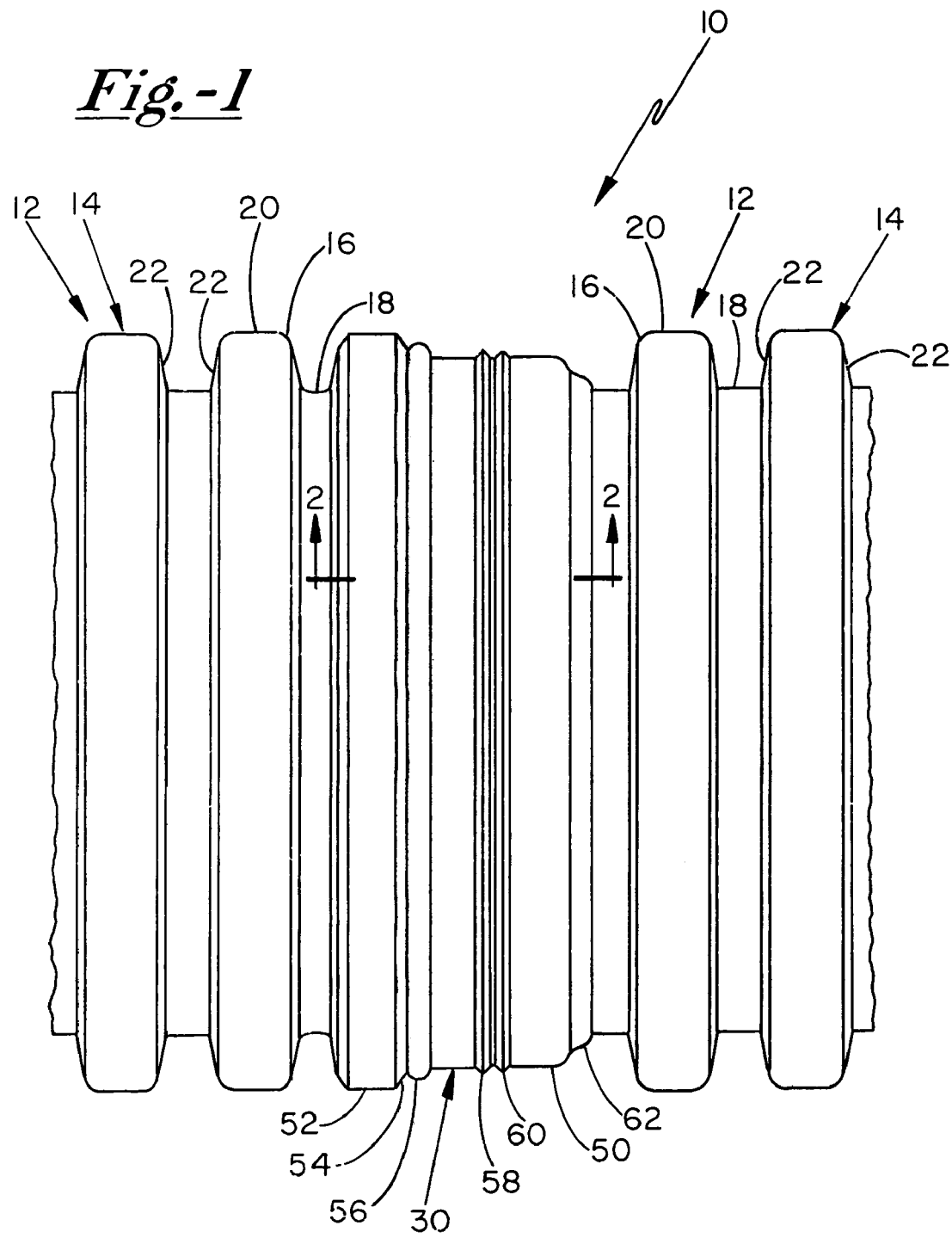
FIG. 1 is a side elevational view of adjoining sections of dual wall pipe, showing an assembled pipe coupling system made in accordance with the present invention.

With reference to FIG. 1 of the drawings, an improved bell and spigot coupling system 10 is shown which is particularly well-suited for use in joining sections of corrugated plastic pipe 12 in gravity flow drainage and sewage applications requiring watertight joints. In accordance with the present invention, the adjoining sections of pipe 12 each have an outer corrugated sidewall 14 defined by spaced apart successive annular ribs 16 with annular valley defining portions 18 deposed therebetween. Each successive rib 16 is formed having a rib crest 20 and annular rib walls 22 which extend radially inward from the crest 20 to interconnect with and define the adjacent valley defining portions 18 of the sidewall 14. As shown best in FIG. 2, the corrugated pipe 12 is preferably of the dual wall type having an inner cylindrical smooth liner 24 that is attached to and integrally formed with the outer corrugated sidewall 14 at each of the valley defining portions 18 thereof.

In the preferred embodiment, each section of corrugated pipe 12 has a male end portion 26 with a terminal spigot end 28, and an opposite female end portion or bell coupler 30 which is constructed and adapted to receive the spigot end 28 of a similarly constructed section of pipe 12 to complete the coupling system 10. While the drawings herein disclose a single coupling system 10 for joining sections of pipe 12, it will be appreciated that multiple sections of pipe 12 can be joined together in like manner to form a corrugated piping system of indeterminate length.

Figure 2:
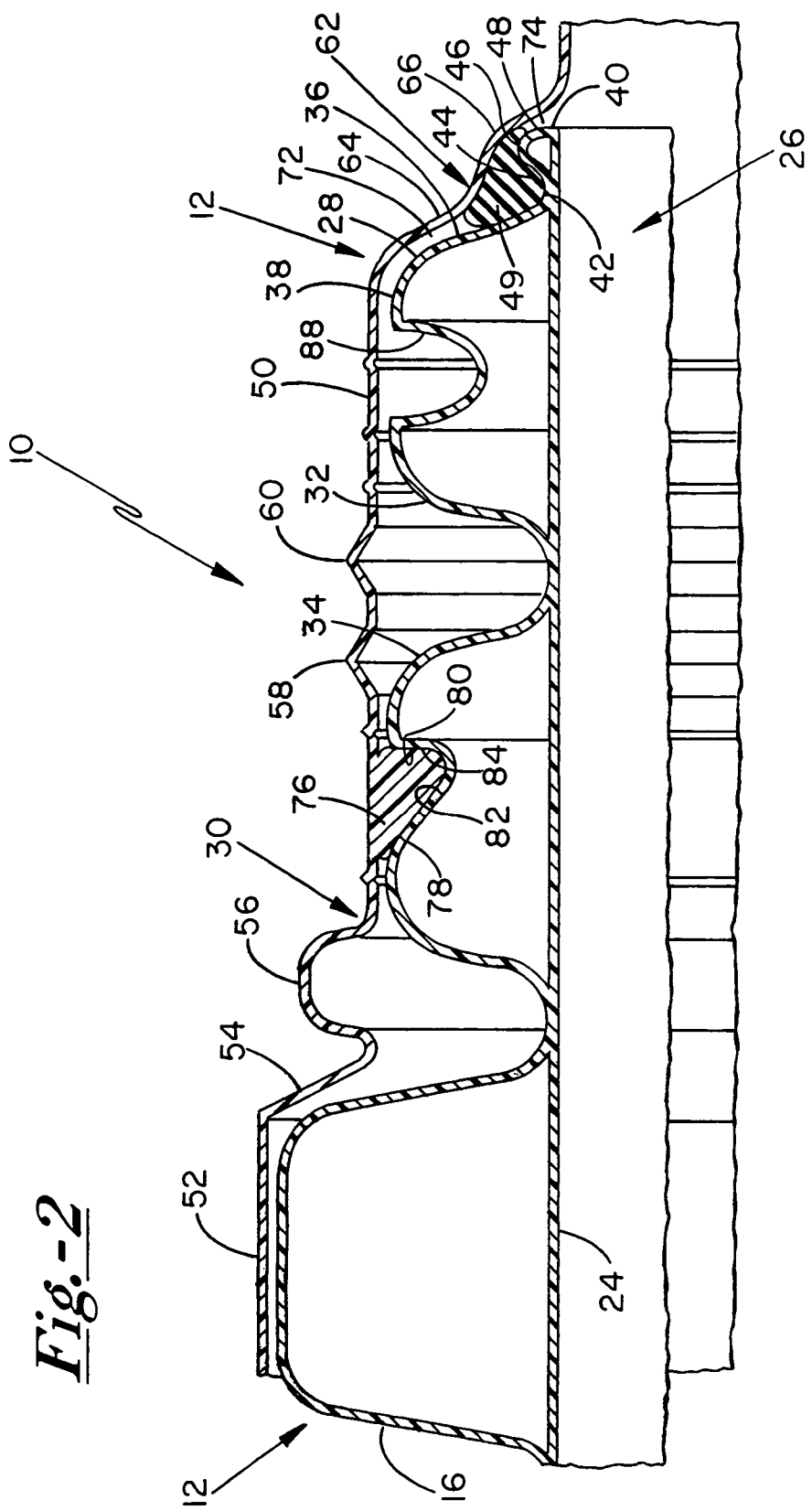
FIG. 2 is an enlarged vertical sectional view of the pipe coupling system shown in FIG. 1.

With reference being made to FIG. 2, it can be seen that the male end portion 26 of pipe 12 which is received within bell 30 includes a pair of annular ribs 32 and 34, each of which has a reduced outer diameter relative to the remainder of the annular ribs 16 which form sidewall 14 of corrugated pipe 12. As shown, the leading rib wall 36 of the first annular rib 32 of the inserted section of pipe 12 extends generally radially inward from its rib crest 38 toward the inner cylindrical liner 24 thereof. This leading rib wall 36 merges with and is joined to a terminal gasket bed-forming rib 40 at the inner liner 24, thereby forming an annular gasket bed 42 which extends circumferentially around the spigot end 28 of the inserted section of pipe 12.

The gasket bed-forming rib 40 is of significantly smaller compass than all other annular ribs of pipe 12, having a substantially reduced outer diameter relative to that of the adjacent annular rib 32. As such, the gasket bed-forming rib 40 has a shortened bed-forming wall 44 which extends radially inward from its crest 46 toward the inner liner 24, where it connects with the longer leading rib wall 36 of adjacent rib 32 to form the gasket bed 42. The outer terminal wall 48 of the gasket bed-forming rib 40, which also extends radially inward from its crest 46, terminates at and is integrally formed with inner liner 24 at the end of the inserted section of pipe 12. The leading rib wall 36 of annular rib 32, together with the annular bed-forming rib 40, function to define the spigot end 28 of pipe 12, and gasket bed 42 within which an annular elastomeric gasket 49 is retained.

The bell 30 formed at the opposite female end of a section of pipe 12 constitutes a sleeve element which, as shown in FIG. 2, is adapted to receive the male end portion 26 and spigot end 28 of a like section of pipe 12 therein. As shown, bell 30 includes a generally cylindrical sidewall 50, the inside diameter of which is just slightly greater than the outside diameter of the male end portion 26 of the section of pipe 12 received therein. The terminal portion 52 of bell 30 is shown slightly greater in diameter than the remainder of the bell to accommodate and extend over the first of the remaining larger diameter ribs 16 of the inserted section of pipe 12. It will be appreciated, however, that depending on the application and desired design of the bell configuration, terminal portion 52 may be shortened so as not to extend as far over such rib 16, or even eliminated, without departing from the invention herein.

As shown, the terminal portion 52 of bell 30 is connected to the remainder of bell 30 via an annular collar 54. Collar 54 angles radially inward and away from terminal portion 52 in such manner as to help facilitate guidance and alignment of the inserted section of pipe 12 within bell 30. An annular reinforcement rib 56 is formed in bell 30 adjacent to collar 54 so as to further strengthen the bell coupler 30 at this point. Additional reinforcement ribs 58 and 60 are also added to the sidewall 50 of bell 30 for added support thereto, as shown in the drawings.

An important aspect of the present invention is the interface between the bell 30 and the spigot end 28 of the section of pipe 12 received therein. As shown in FIG. 2, formed integrally as a part of bell 30 and disposed immediately adjacent the spigot end 28 of the inserted section of pipe 12 is a generally radially extending gasket sealing surface 62. This gasket sealing surface 62 extends generally radially inward from the sidewall 50 of the bell 30 toward the terminal bed-forming rib 40 located at the spigot end 28 of the inserted section of pipe 12, and forms a generally radial extending interface therewith. As shown best in FIG. 2A, the gasket sealing surface 62 has an undulated cross sectional configuration formed by first and second arcuate portions 64 and 66, respectfully. The first arcuate portion 64 is disposed adjacent to and curves toward the leading rib wall 36 of the first annular rib 32 of the inserted section of pipe 12. The second arcuate portion 66, which is disposed radially inward from the first arcuate portion 64, curves in the opposite direction around and closely adjacent to the terminal bed-forming rib 40.

Figure 2A:
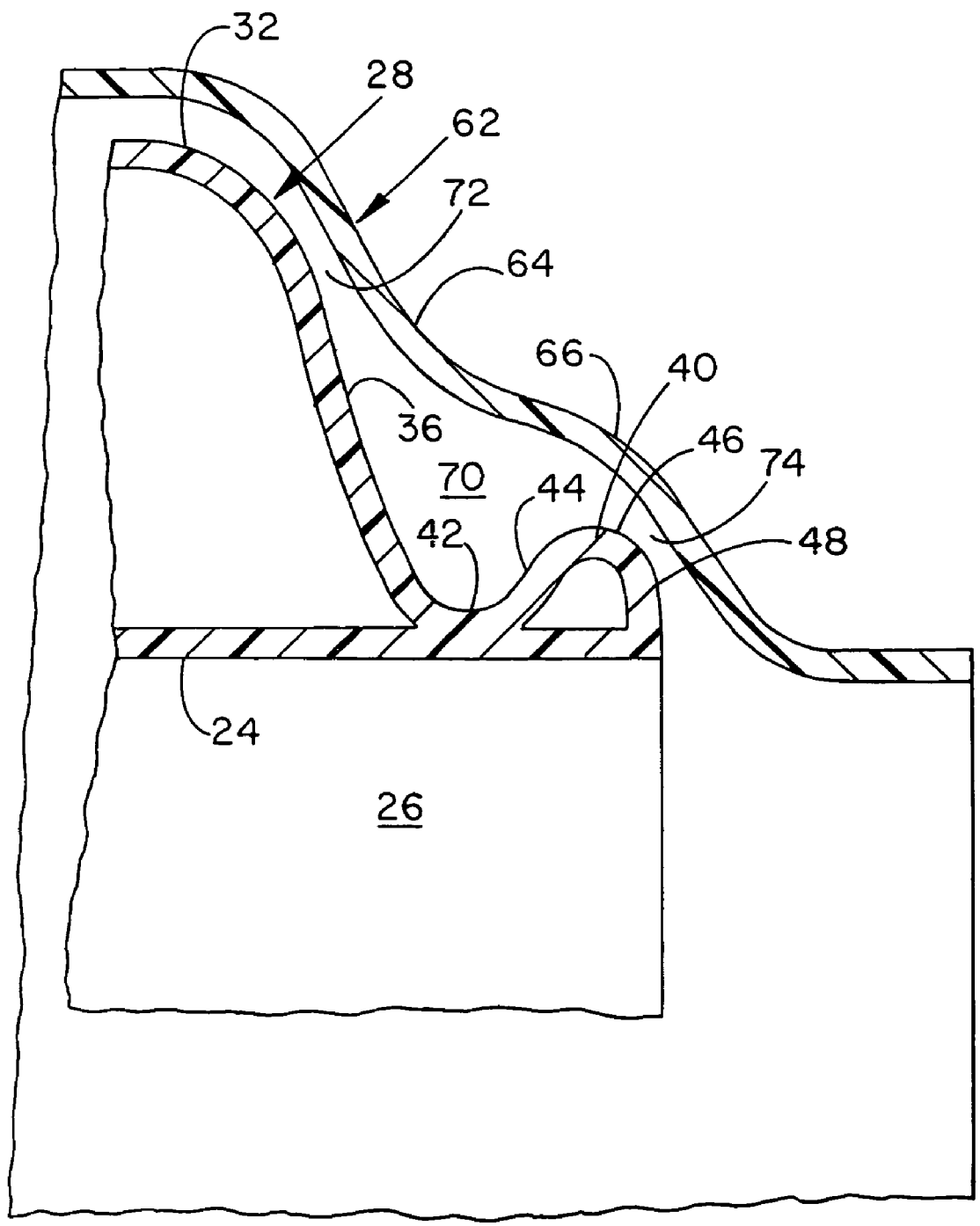
FIG. 2A is an enlargement of the bell and spigot interface of the pipe coupling system shown in FIG. 2, with the gasket removed to better illustrate the profile of the interfacing surfaces thereof.

As seen in FIGS. 2 and 2A, the gasket sealing surface 62 of bell 30 follows the general contour of the inserted pipe's spigot end 28, and interfaces therewith to define a gasket chamber 70 of relatively small compass, which houses gasket 49. This not only helps to reduce the necessary volume of gasket required to provide an effective seal, but more importantly, and for reasons that will become more apparent hereafter, the close interface between the gasket sealing surface 62 and the spigot end 28 of the inserted section of pipe 12 functions to define a pair of constricted pathways 72 and 74 at opposing sides of gasket chamber 70, and consequently gasket 49.

As shown, the first constricted pathway 72 converges away from the gasket chamber 70 in a generally radially outward direction along the interface between the first arcuate portion 64 of the gasket sealing surface 62 and the leading rib wall 36 of the inserted pipe's first annular rib 32. The second constricted pathway 74, which is located at an opposing and radially inward side of gasket 49, converges away from the gasket chamber 70 in a generally radially inward direction along the interface between the second arcuate portion 66 of gasket sealing surface 62 and the crest 46 and terminal wall 48 of the inserted pipe's gasket bed-forming rib 40. From this, it will be appreciated that the resulting interface between the bell's gasket sealing surface 62 and the inserted pipe's spigot end 28 defines a pathway therebetween which constricts in generally opposite radial directions away from gasket chamber 70 and gasket 49 to areas of significantly smaller volume.

As further shown in FIG. 2, the elastomeric gasket 49, which is seated and retained within gasket bed 42, is constructed of sufficient volume to substantially fill the gasket chamber 70 and protrude outwardly beyond the outer confines of the bed-forming rib 40. Under such circumstances, and upon perfecting the coupled joint 10, the gasket 49 will be compressed within the gasket bed 42 and between the generally radially extending gasket sealing surface 62 and leading rib wall 36 of the inserted pipe's first annular rib 32. As seen in FIG. 2, the gasket is preferably constructed of sufficient volume such that, when compressed, it will tend to flow into the first and second constricted pathways, 72 and 74, disposed on opposite sides thereof.

In order to complete the coupling system, and insure proper joint alignment and compression of the sealing gasket 49, the bell 30 includes a plurality of circumferentially spaced latching members or locking tabs 76 which function to lockingly engage the inserted section of pipe 12. As seen in FIG. 2, such locking tabs 76 are formed integrally with the sidewall 50 of bell 30, and extend radially inward toward the inserted section of pipe 12. Each locking tab 76 has a sloped camming surface 78 that faces toward the terminal end 52 of the bell 30, and an oppositely facing locking surface 80 which extends radially inward from the sidewall 50 in a plane substantially perpendicular thereto. In the preferred embodiment, it is contemplated that four (4) such locking tabs 76 be spaced equally around the periphery of bell 30, but it will be appreciated that more or less locking tabs 76 could be utilized, if desired or deemed necessary for a given application.

The corresponding male end portion 26 of pipe 12 that is received within the bell 30 is formed with a radially inward extending annular recess or catch element 82, which is adapted to receive the locking tabs 76 formed in the bell 30 upon perfecting the coupled joint 10. As shown in FIG. 2, this annular catch element 82 is preferably formed in the crest of annular rib 34, and has a complimentary shape that conforms to the shape of the engaging locking tabs 76. Upon insertion of the male end portion 26 of a section of pipe 12 within bell 30, the camming surface 78 of each locking tab 76 will bear against the inserted pipe's outer sidewall 14, thus causing the sidewall 50 of the bell 30 to deflect outwardly and allow passage of the inserted pipe 12 therein. Once pipe 12 is fully inserted, as shown in FIG. 2, the locking tabs 76 will snap into the annular catch element 82, with the tabs' locking surface 80 bearing firmly against the corresponding stop surface 84 of the annular catch element 82.

Optionally, if necessary to facilitate easier insertion of pipe 12, it is contemplated that the locking tabs 76 may be cut or otherwise relieved about three (3) sides (not shown) in a manner well known in the art, as shown in U.S. Pat. No. 4,913,473, the contents of which is incorporated herein by reference thereto. Relieving the tabs 76 in this manner may be beneficial when working with larger diameter corrugated pipe, where wall thicknesses are typically increased, making coupling and installation of pipe more difficult.

It will be appreciated that such locking tabs 76 provide the installer of such a piping system with the benefit of knowing that joint 10 is properly aligned and the gasket 49 is receiving the correct amount of compression. Once secured, the locking tabs 76 help to resist axial separation of the joined sections of pipe 12, and in conjunction with the backfill material surrounding the pipe upon installation, function to hold gasket 49 compressed against the sealing surface 62 of the bell 30.

With the spigot end 28 properly aligned and inserted within bell 30, latch members 76 will properly seat in locking engagement within catch element 82 of the inserted section of pipe 12, thereby perfecting the coupled joint 10 and compressing the gasket 49 in the manner described above. In so doing, the gasket sealing surface 62 interfaces with the spigot end 28 of the inserted section of pipe 12 to form the first and second radially constricted pathways 72 and 74 at opposite sides of the gasket 49. Thus, as the coupled joint 10 is internally pressurized, the gasket 49 will be forced radially outward into the first radially constricted pathway 72. This causes gasket 49 to be wedged into the area of smaller volume created by constricted pathway 72, which functions to improve the seal's effectiveness against leakage. In like manner, as the coupled joint 10 is externally pressurized, the gasket 49 will be forced radially inward into the area of smaller volume created by the second radially constricted pathway 74, thereby also causing a wedging effect that improves the seal's effectiveness against potential leakage. Importantly, regardless of whether the coupled joint 10 experiences an increasing internal or external hydrostatic pressure, the joint's effectiveness is improved as a result of the wedging effect created by the radially extending interface between the spigot end 28 of the inserted section of pipe 12 and the gasket sealing surface 62 of the bell 30.

Whether internal or external hydrostatic pressure is experienced, it will also be appreciated that, as a result of such wedging of gasket 49, a substantial component of the force generated from the applied pressure and entering gasket 49 will be absorbed by the radially extending gasket sealing surface 62 and inserted pipe's leading rib wall 36, thereby transferring such force axially through the joined sections of pipe 12. For this reason, it will be further appreciated that the undulated cross sectional configuration of the gasket sealing surface 62 has the added benefit of providing additional stiffness and strength to resist against deflection caused by increasing hydrostatic pressure experienced at the coupled joint 10.

Figure 3:
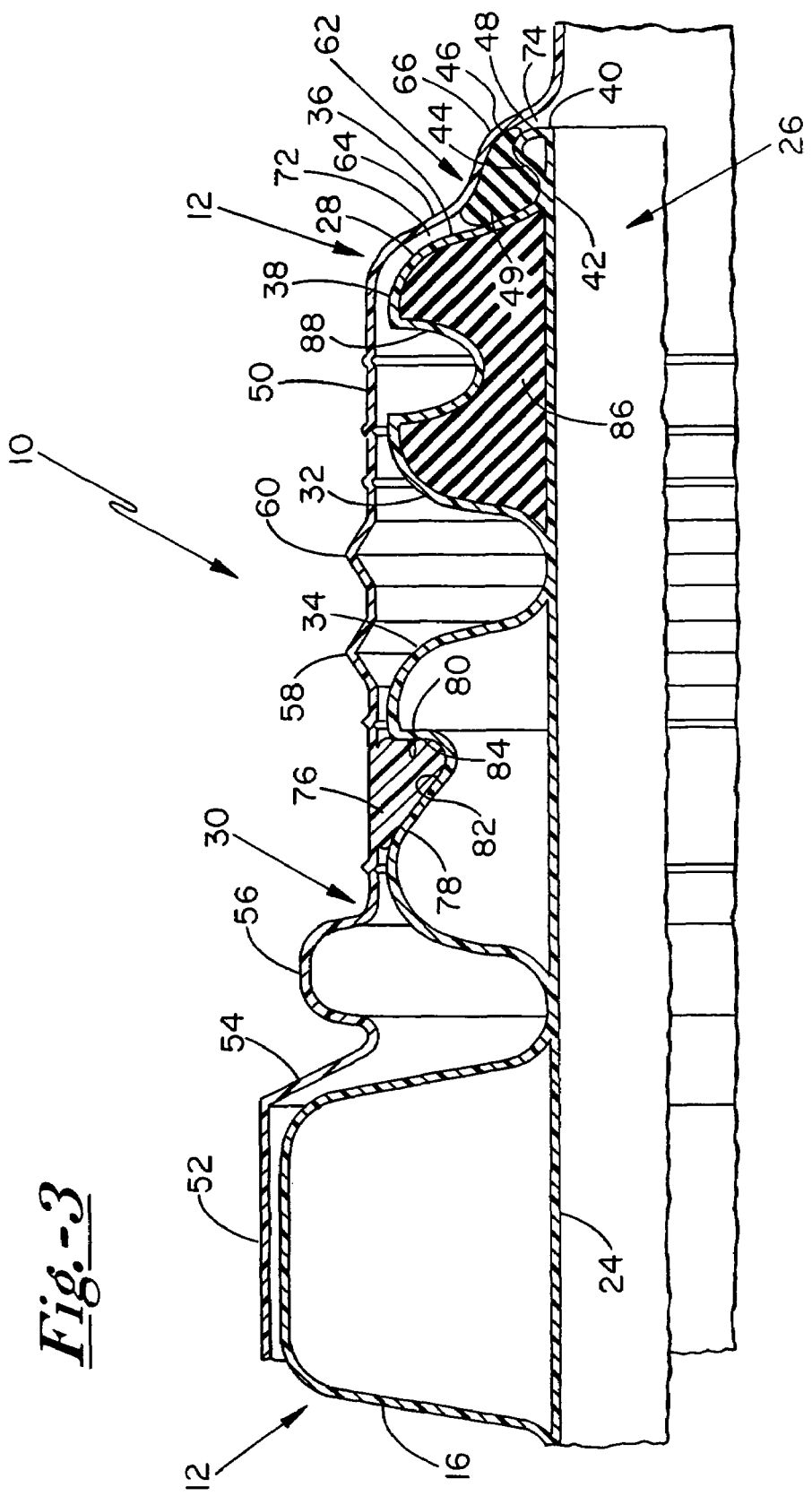
FIG. 3 is an enlarged vertical sectional view of a pipe coupling system similar to that shown in FIG. 2, illustrating an alternative embodiment utilizing a corrugation strengthener.

As an additional alternative to further enhance the joints sealing effectiveness, which is shown in FIG. 3, it is contemplated that a filler material 86, such as foam, may be injected into the cavity formed between the outer wall 14 of the leading annular rib 32 and the inner liner 24 of the inserted pipe 12. By adding such a filler 86, the leading rib wall 36 of annular rib 32 is further reinforced to resist against inward deflection caused by increasing hydrostatic pressure and axial loading, thereby further enhancing the joints sealing effectiveness.

Figure 4:
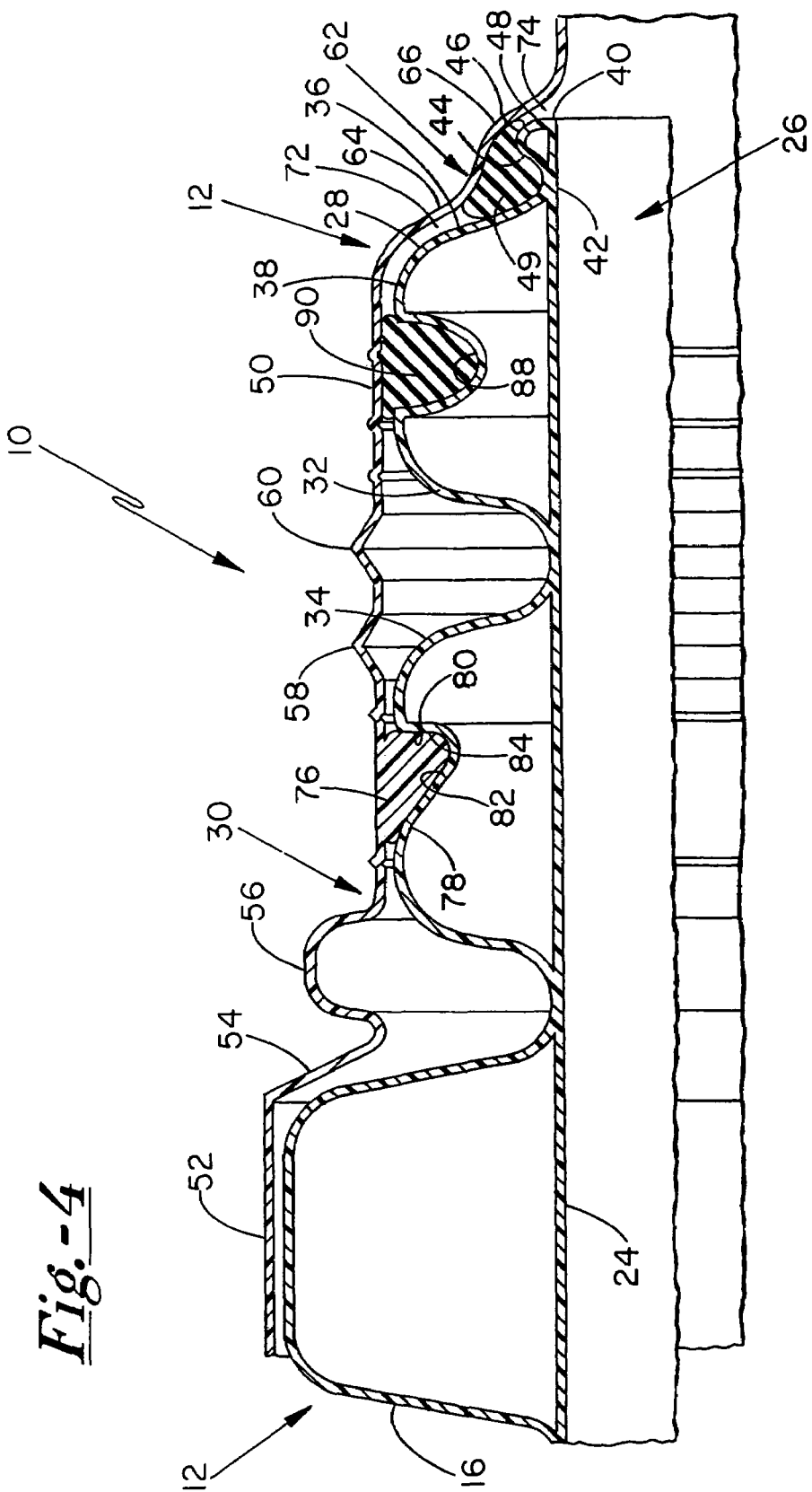
FIG. 4 is an enlarged vertical sectional view of a pipe coupling system similar to that shown in FIG. 2, illustrating another alternative embodiment employing the use of a secondary conventional gasket.

As still a further alternative, it can be seen in FIGS. 2-4 that the outer corrugated wall 14 of the inserted pipe's male end portion 26 may be formed with an additional or secondary annular gasket receiving channel or recessed area 88. As shown, such annular channel 88 is formed in the crest 38 of the first annular rib 32, and is positioned such that an optional gasket 90 (FIG. 4) received therein will be compressed in a conventional manner against the inner axially extending surface formed by the sidewall 50 of bell 30. Although, in accordance with the present invention, it is deemed preferable to utilize and position the primary gasket 49 at the spigot end 28 of the inserted pipe 12, the supplemental gasket receiving channel 88 provides the option for the installer to utilize an alternate gasket 90 in a conventional manner, or possibly use dual gaskets, 49 and 90, seated in respective beds 42 and 88, as shown in FIG. 4.

Figure 5:
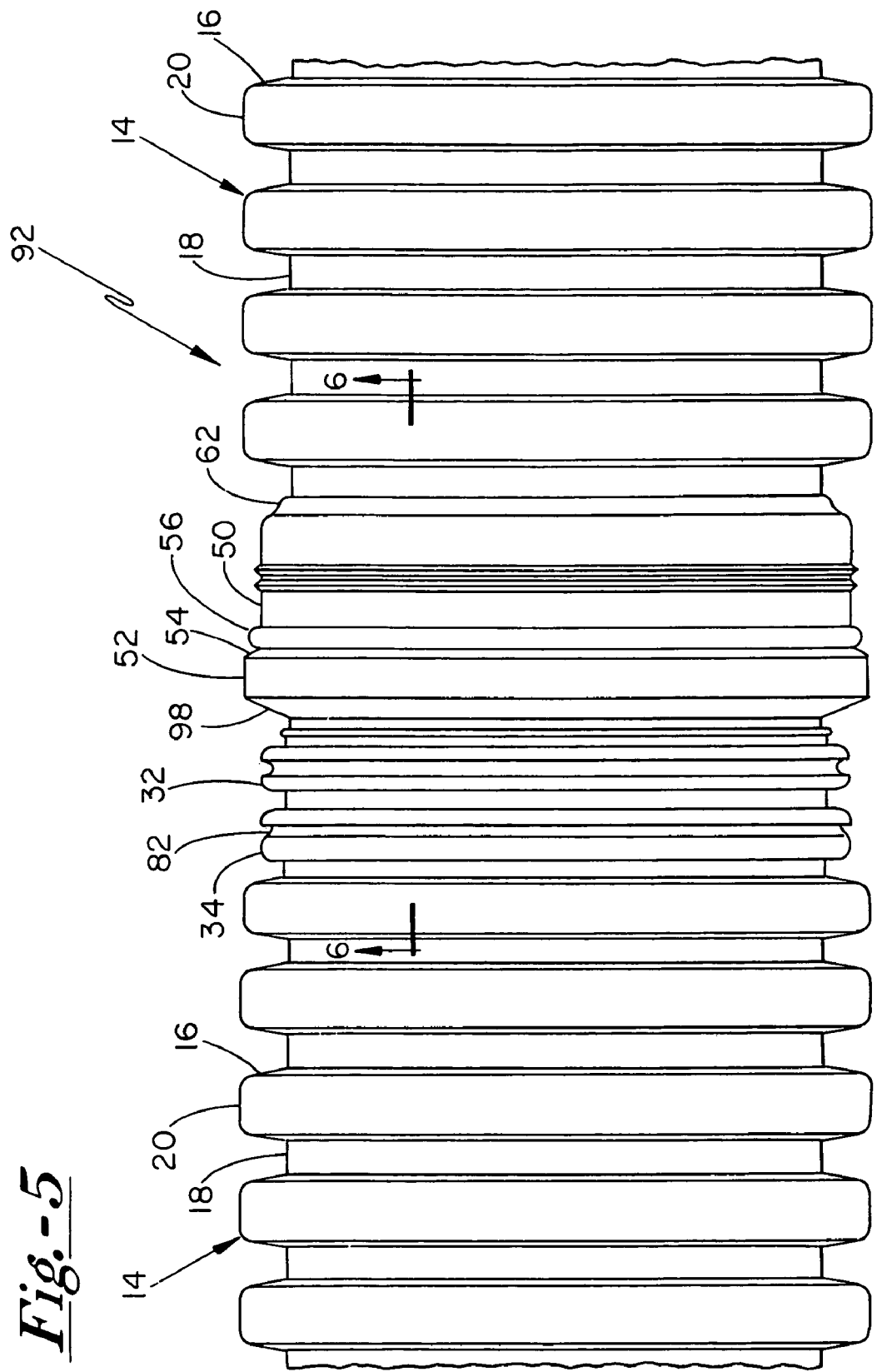
FIG. 5 is a side elevational view of a portion of dual wall pipe made in accordance with the present invention, as manufactured in a continuous extrusion process prior to severing the male end portion from the bell coupler component of the invention.
Figure 6:
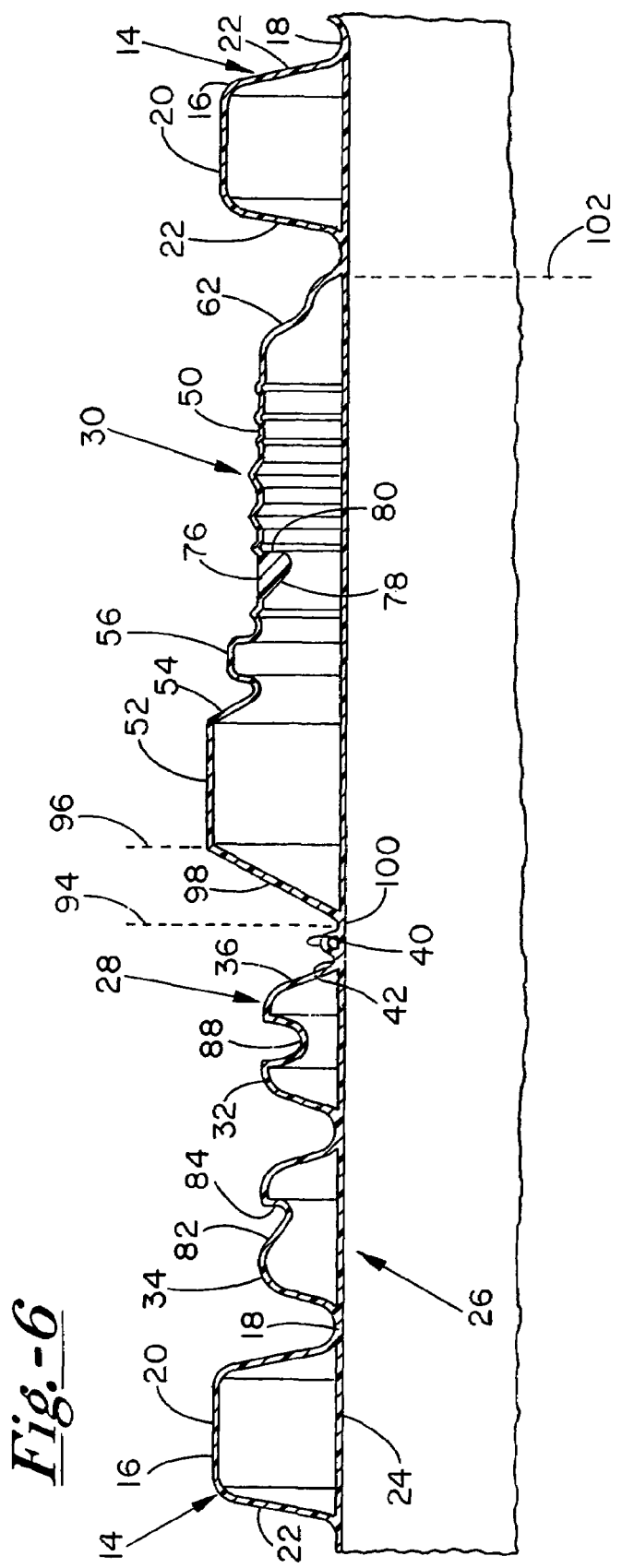
FIG. 6 is a vertical sectional view of the dual wall pipe shown on FIG. 5, showing the placement of the selected cuts made to sever the male end portion from the bell coupler component of the invention, and separate the pipe into individual pipe sections.

The plastic pipe 12 shown in FIGS. 1-6, inclusive, are preferably molded out of high density polyethylene (HDPE), but it is contemplated that such pipe could be manufactured out of other plastic materials as well, such as PVC or polypropylene. As shown in FIGS. 5 and 6, the sections of pipe 12 are preferably manufactured continuously by molding the same integrally utilizing an extrusion molding process well known in the art. As best seen in FIG. 6, the outer corrugated sidewall 14 and inner liner 24 are thermally bonded or molded together in the continuous extrusion process to form a continuing length of integral dual wall pipe 92. Conventional molding equipment (not shown) similar to that shown and described in U.S. Pat. No. 4,439,130, adapted to produce such dual wall plastic pipe, may be utilized in the process.

By utilizing a few carefully selected cuts after molding, such a continuous pipe 92 can be readily cut into individual sections 12 in which one end portion functions as the female connector or bell 30 and the other end portion functions as the male portion 26 with the spigot end 28. As shown best in FIG. 6, upon exiting the molding equipment, an initial pair of cuts is preferably made simultaneously with an automated sawing machine through continuous pipe 92 to remove the collar portion 98 and separate the pipe into individual pipe sections 12. As shown, the first of these cuts is made along broken line 94 through both the outer corrugated sidewall 14 and inner liner 24 at the base 100 of collar 98, immediately adjacent the annular gasket-bed forming rib 40. The second cut may be made at any point along portion 52 to form the desired terminal end of bell 30, but in keeping with the embodiment disclosed in the present drawings, is shown in FIG. 6 as being made along broken line 96 at the larger end of collar 98. Notably, cut 96 extends only through the outer sidewall, thus leaving the inner liner 24 attached to the severed collar 98 at its base 100.

In order to sever the remaining portion of inner liner 24 from within the bell 30 and complete the manufacture of each pipe section 12, a third and final cut is made through the inner liner 24 of each section along broken line 102. This cut may be done manually or with an automated saw, and as shown, trims away only the excess liner 24 from within bell 30, leaving intact the outer sidewall 14 which then forms the remainder of each section 12 of corrugated pipe. While the above-described continuous manufacturing process is deemed preferable for producing such sections of corrugated pipe 12 having the improved coupling system, it will be appreciated that the manner in which the sections of pipe 12 are actually formed and cut into individual sections may vary without departing from the invention herein.

As stated previously, the present invention marks a significant improvement over conventional bell and spigot coupling systems in that the joint configuration and placement of the gasket is such that the gasket is compressed between generally radial, rather than axial, extending surfaces, and increasing internal and external pressure on the coupling system tends to improve the effectiveness of the seal. Unlike the prior art, the present coupling design has minimal reliance on friction between the gasket and the sealing surface, and assures that under fluid pressure from either direction, the gasket will tend to wedged into a smaller volume, thus assuring tighter sealing as the pressure increases. There will be no opportunity for the gasket to "roll over" and leak, as is common in conventional bell and spigot coupler designs utilized in water-tight applications.

Also, with the gasket 49 positioned at the end of the pipe, the use of a lubricant on the gasket during installation to lower the gasket's coefficient of friction, as generally required in conventional bell and spigot coupling systems, is effectively eliminated. Thus, installation of the pipes may be accomplished more easily and at a lower cost. Dimensional control between the bell and spigot to account for the gasket also becomes less critical, thereby reducing the need for repeated reconstruction of the joint-forming molds of the coupling system, and consequently leading to additional savings in time and money.

It will, of course, be understood that various changes may be made in the form, details, arrangement, and proportions of the parts of the subject invention without departing from the scope of the invention which comprises the matter shown and described herein and set forth in the appended claims.

The invention claimed is:
1. A coupling system for corrugated pipe, comprising:
(a) a section of pipe having a spigot end and an outer corrugated sidewall defined by spaced apart successive annular ribs with annular valley-defining portions disposed therebetween;
(b) a gasket bed formed by said outer sidewall adjacent said spigot end of said section of pipe, said gasket bed being defined by and disposed between an annular rib wall and an adjoining terminal annular bed-forming rib located at said spigot end of said section of pipe, said annular bed-forming rib being of a substantially smaller diameter than said adjoining annular rib wall;
(c) a gasket seated within said gasket bed and protruding outwardly therefrom beyond the outer confines of said bed-forming rib;
(d) a sleeve element having a generally cylindrical sidewall and an open end into which said spigot end of said section of pipe is received, said sleeve element having an annular gasket sealing surface disposed adjacent said spigot end of said section of pipe, said gasket sealing surface extending generally radially inward from said sidewall of said sleeve element toward said bed-forming rib and compressing said gasket within said gasket bed;
(e) a plurality of circumferentially spaced latch members located on said sidewall of said sleeve element and extending radially inward therefrom, each of said latch members engaging said section of pipe so as to assure proper compression of said gasket and resist axial uncoupling forces between said sleeve element and said section of pipe caused by the presence of internal or external fluid pressure on the coupling system; and (f) a first constricted pathway defined between said gasket sealing surface and said annular rib wall on one side of said gasket bed, and a second constricted pathway defined between said gasket sealing surface and said bed-forming rib on an opposing side of said gasket bed, whereby internal fluid pressure generated within said section of pipe will cause said gasket to wedge within said first constricted pathway, and external fluid pressure exerted on said pipe will cause said gasket to wedge within said second constricted pathway, thereby preventing fluid exfiltration or infiltration through the coupling system.

2. The coupling system defined in claim 1, wherein said section of pipe includes an inner cylindrical smooth liner attached to said valley-defining portions of said outer sidewall, and to said gasket bed.

3. The coupling system defined in claim 1, wherein at least one of said first and second constricted pathways extend in a generally radial direction relative to said section of pipe and said sleeve element.

4. The coupling system defined in claim 1, wherein said gasket sealing surface has an undulated cross sectional profile.

5. The coupling system defined in claim 4, wherein said gasket sealing surface includes a first arcuate portion having an extrados surface which protrudes inwardly toward said gasket bed.

6. The coupling system defined in claim 5, wherein said extrados surface of said first arcuate portion forms said first constricted pathway with said annular rib wall.

7. The coupling system defined in claim 5, wherein said gasket sealing surface includes a second arcuate portion disposed generally radially inward from said first arcuate portion, said second arcuate portion having an intrados surface which generally contours said terminal bed-forming rib.

8. The coupling system defined in claim 4, wherein said gasket sealing surface contours generally the formation of said bed-forming rib, said gasket bed and said adjoining rib wall, defining said first and second constricted pathways therebetween.

9. The coupling system defined in claim 1, wherein said gasket, when compressed within said gasket bed, flows outwardly toward said first and second constricted pathways.

10. The coupling system defined in claim 1, wherein at least one of said annular ribs adjacent said spigot end of said section of pipe has a reduced outer diametrical dimension relative to the remaining said annular ribs of said section of pipe.

11. The coupling system defined in claim 1, wherein at least one of said annular ribs adjacent said spigot end of said section of pipe have a rib crest with a secondary annular gasket bed formed therein.

12. The coupling system defined in claim 1, wherein at least one of said annular ribs adjacent said spigot end of said section of pipe has a rib crest with a radially inward protruding catch element cooperatively formed therein for engagement by said plurality of latch members.

13. The coupling system defined in claim 1, wherein said section of pipe has an end opposite said spigot end received in said sleeve, said opposite end being integrally connected to a second sleeve element which is constructed in the same manner as said sleeve element.

14. A coupling system for corrugated pipe, comprising:

(a) a length of pipe having an inner cylindrical smooth liner and an outer corrugated sidewall defined by alternating annular rib and valley portions connected to said liner;

(b) one of said annular ribs having a rib crest and an elongated rib wall located adjacent a spigot end of said length of pipe, said rib wall extending generally radially inward from said rib crest toward said inner liner and terminating at a gasket bed, said gasket bed being defined by and disposed between said rib wall and an adjoining annular bed-forming rib located at said spigot end of said pipe, said bed-forming rib having a relatively minor diametrical dimension in comparison to that of said adjoining rib wall;

(c) a gasket seated within said gasket bed and protruding outwardly therefrom beyond the outer confines of said bed-forming rib;

(d) a sleeve element having a generally cylindrical sidewall and an open end into which said spigot end of said length of pipe is received, said sleeve element having an annular gasket sealing surface disposed adjacent said spigot end of said length of pipe, said gasket sealing surface extending generally radially inward from said sidewall of said sleeve element toward said bed-forming rib and compressing said gasket within said gasket bed;

(e) a plurality of circumferentially spaced latch members located on said sidewall of said sleeve element and extending radially inward therefrom, each of said latch members engaging said corrugated sidewall of said length of pipe so as to assure proper compression of said gasket and resist axial uncoupling forces between said sleeve element and said length of pipe caused by the presence of internal or external fluid pressure on the coupling system; and (f) said rib wall and said bed-forming rib interfacing with said gasket sealing surface of said sleeve element to form a first constriction between said length of pipe and said sleeve element adjacent an exteriorly exposed surface of said gasket, and a second constriction between said length of pipe and said sleeve element adjacent an interiorly exposed surface of said gasket, whereby internal fluid pressure generated within said length of pipe will cause said gasket to wedge within said first constriction, and external fluid pressure exerted on said pipe will cause said gasket to wedge within said second constriction, thereby preventing fluid exfiltation or infiltration through the coupling system.

15. The coupling system defined in claim 14, wherein said first constriction extends generally radially between said rib wall and said gasket sealing surface, such that internal fluid pressure within said length of pipe that causes said gasket to be wedged within said first constriction will be transferred axially through said gasket into said length of pipe and into said sleeve element.

16. The coupling system defined in claim 14, wherein said second constriction extends generally radially between said bed-forming rib and said gasket sealing surface, such that external fluid pressure exerted on said length of pipe that causes said gasket to be wedged within said second constriction will be transferred axially through said gasket into said length of pipe and into said sleeve element.

17. The coupling system defined in claim 14, wherein said gasket sealing surface has an intermediate portion which protrudes radially inward toward said gasket bed, thereby defining said first constriction along said rib wall at a point intermediate the length thereof.

18. The coupling system defined in claim 14, wherein said first constriction begins approximately midway along the length of said rib wall and constricts toward said rib crest.

19. The coupling system defined in claim 14, wherein said bed-forming rib has a bed-forming wall and a terminal wall, said bed-forming wall merging into said rib wall of said adjoining annular rib at said inner liner of said length of pipe, and being integrally connected to said liner.

20. The coupling system defined in claim 19, wherein said bed-forming wall extends radially outward from said liner less than approximately 25% the radial distance of said rib wall measured from said liner to said rib crest.

21. The coupling system defined in claim 19, wherein said second constriction extends generally radially between said terminal wall of said bed-forming-rib and said gasket sealing surface, such that external fluid pressure exerted on said length of pipe that causes said gasket to be wedged within said second constriction will be transferred axially through said gasket into said length of pipe and into said sleeve element.

22. The coupling system defined in claim 14, wherein said gasket sealing surface extends radially inward from said sidewall of said sleeve element to a point immediately adjacent said inner liner of said length of pipe, said gasket sealing surface having an undulated cross sectional profile.

23. The coupling system defined in claim 14, wherein said gasket sealing surface includes a first arcuate portion, the extrados surface of which faces said rib wall of said annular rib adjacent said spigot end of said length of pipe received within said sleeve element, and a second arcuate portion disposed generally radially inward from said first arcuate portion, the intrados surface of said second arcuate portion being adjacent to and facing said terminal bed-forming rib.

24. The coupling system defined in claim 14, wherein one of said annular ribs located adjacent said spigot end of said length of pipe received within said sleeve element has a rib crest with an annular recessed area extending radially inward therefrom, said recessed area being adapted for receipt of a secondary gasket therein.

25. A coupling system for corrugated pipe, comprising:
(a) a length of pipe having a spigot end, an inner cylindrical smooth liner, and an outer corrugated sidewall defined by alternating annular rib and valley portions connected to said liner;
(b) said spigot end of said length of pipe having a terminal gasket bed-forming rib integrally connected to an adjacent rib wall of one of said annular ribs to define a gasket bed therebetween, said terminal gasket bed-forming rib having a substantially smaller outer diameter than said adjoining rib wall;
(c) a gasket seated within said gasket bed and protruding radially outward therefrom beyond the outer confines of said bed-forming rib;
(d) a sleeve element having a generally cylindrical sidewall and an open end into which said spigot end of said length of pipe is received, said sleeve element having an annular gasket sealing surface disposed adjacent said spigot end of said length of pipe and forming a generally radial extending interface therewith;
(e) latching means connecting said sleeve element to said length of pipe for assuring proper compression of said gasket and for resisting axial uncoupling forces between said sleeve element and said length of pipe caused by the presence of internal or external fluid pressure on the coupling system; and
(f) a first gasket-wedging region being defined by said radially extending interface on one side of said gasket and a second gasket-wedging region being defined by said radially extending interface on an opposing side of said gasket, whereby increasing internal fluid pressure on said coupling system causes said gasket to be forced into said first gasket-wedging region, and increasing external fluid pressure on said coupling system causes said gasket to be forced into said second gasket-wedging region.

26. The coupling system defined in claim 25, wherein each of said first and said second gasket-wedging regions are formed by a generally radial extending constriction between said spigot end of said length of pipe and said gasket sealing surface of said sleeve.

27. The coupling system defined in claim 26, wherein said first gasket-wedging region is constructed and arranged to constrict generally in a radial outward direction.

28. The coupling system defined in claim 26, wherein said second gasket-wedging region is constructed and arranged to constrict generally in a radial inward direction.

29. The coupling system defined in claim 25, wherein said first gasket-wedging region is formed by a generally radially outward extending constriction between said gasket sealing surface and said rib wall defining said gasket bed.

30. The coupling system defined in claim 25, wherein said second gasket-wedging region is formed by a generally radially inward extending constriction between said gasket sealing surface and said bed-forming rib.

31. The coupling system defined in claim 25, wherein said latching means is comprised of a plurality of latch members that are circumferentially spaced around said sidewall of said sleeve element and extend radially inward therefrom to engage said length of pipe.

32. The coupling system defined in claim 25, wherein a plurality of said annular ribs adjacent said spigot end of said length of pipe are received within said sleeve element, and at least one of said annular ribs received within said sleeve element has a smaller outer diameter than the outer diameter of the remainder of said annular ribs defining said outer corrugated wall of said length of pipe.

33. The coupling system defined in claim 25, wherein one of said annular ribs has a rib crest which forms an annular channel for receiving a second gasket in compressed relation between said length of pipe and said sleeve element.

34. A coupling system for corrugated pipe, comprising:
(a) a section of pipe having a spigot end and an outer corrugated sidewall defined by spaced apart successive annular ribs with annular valley-defining portions disposed therebetween;
(b) a first gasket bed formed by said outer sidewall adjacent said spigot end of said section of pipe, said first gasket bed being defined by and disposed between an annular rib wall and an adjoining terminal bed-forming rib located at said spigot end of said pipe, said bed-forming rib having a substantially smaller diametrical dimension than said adjoining rib wall;
(c) a second gasket bed formed in the crest of one of said annular ribs adjacent said spigot end of said section of pipe;
(d) a sleeve element having a generally cylindrical sidewall and an open end into which said spigot end of said corrugated pipe is received, said sleeve element extending over said second gasket bed, and said sleeve element having an annular gasket sealing surface disposed adjacent said first gasket bed and said spigot end of said section of pipe, said gasket sealing surface extending generally radially inward from said sidewall of said sleeve element toward said bed-forming rib;

(e) a first constricted pathway defined between said gasket sealing surface and said annular rib wall on one side of said first gasket bed, and a second constricted pathway defined between said gasket sealing surface and said bed-forming rib on an opposing side of said first gasket bed;

(f) a gasket seated within at least one of said first and second gasket beds in compressed relation between said section of pipe and said sleeve element; and (g) a plurality of circumferentially spaced latch members located on said sidewall of said sleeve element and extending radially inward therefrom, each of said latch members engaging said section of pipe so as to resist axial uncoupling forces between said sleeve element and said section of pipe caused by the presence of internal or external fluid pressure on the coupling system, thereby maintaining said gasket in compressed relation between said section of pipe and said sleeve element.

* * * * *